(12) United States Patent
Oami (10) Patent No.: US 12,236,611 B2
(45) Date of Patent: Feb. 25, 2025

(54) OBJECT TRACKING DEVICE, OBJECT TRACKING METHOD, AND RECORDING MEDIUM

(71) Applicant: NEC Corporation, Tokyo (JP)

(72) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 504 days.

(21) Appl. No.: 17/622,310

(22) PCT Filed: Mar. 31, 2020

(86) PCT No.: PCT/JP2020/014821
§ 371 (c)(1),
(2) Date: Dec. 23, 2021

(87) PCT Pub. No.: WO2021/199286
PCT Pub. Date: Oct. 7, 2021

(65) Prior Publication Data
US 2022/0254034 A1    Aug. 11, 2022

(51) Int. Cl.
*G06T 7/20* (2017.01)
*G06T 7/00* (2017.01)
*G06T 19/00* (2011.01)

(52) U.S. Cl.
CPC ............... *G06T 7/20* (2013.01); *G06T 7/00* (2013.01); *G06T 19/006* (2013.01); *G06T 2207/30241* (2013.01)

(58) Field of Classification Search
CPC ........... G06T 7/20; G06T 7/00; G06T 19/006; G06T 2207/30241
See application file for complete search history.

(56) References Cited

U.S. PATENT DOCUMENTS 10,339,387 B2 * 7/2019 Beard ................. H04N 23/683
10,410,055 B2 * 9/2019 Wang .................... G06V 20/54
(Continued)

FOREIGN PATENT DOCUMENTS

JP    2009-089365 A    4/2009
JP    2018-060326 A    4/2018
(Continued)

OTHER PUBLICATIONS

International Search Report for PCT Application No. PCT/JP2020/014821, mailed on Jul. 28, 2020.
(Continued)

*Primary Examiner* — Shefali D Goradia
(74) *Attorney, Agent, or Firm* — Michael Dryja (57) ABSTRACT

An object tracking device includes a location information acquisition means configured to acquire location information of an object detected by a sensor, a sensor speed acquisition means configured to acquire speed information of the sensor, a parameter control means configured to generate parameter control information including information for controlling a parameter for use in a tracking process of the object on the basis of the speed information acquired by the sensor speed acquisition means, and an object tracking means configured to perform the tracking process using the parameter control information generated by the parameter control means and the location information acquired by the location information acquisition means.

11 Claims, 5 Drawing Sheets

(56) References Cited

U.S. PATENT DOCUMENTS

| | | | |
|---|---|---|---|
| 2009/0080701 | A1 | 3/2009 | Meuter et al. |
| 2014/0334668 | A1 | 11/2014 | Saund |
| 2018/0137376 | A1 | 5/2018 | Suzuki et al. |
| 2018/0362185 | A1 | 12/2018 | Qian et al. |
| 2019/0370978 | A1 | 12/2019 | Hashimoto et al. |
| 2020/0126239 | A1 | 4/2020 | Qian et al. |
| 2021/0147077 | A1* | 5/2021 | Raabe .................. G08G 5/0052 |

FOREIGN PATENT DOCUMENTS

| | | |
|---|---|---|
| JP | 2018-129063 A | 8/2018 |
| JP | 2019-511044 A | 4/2019 |
| JP | 2019-128944 A | 8/2019 |
| JP | 2019-211831 A | 12/2019 |
| WO | 2014/083910 A1 | 6/2014 |
| WO | 2017/147749 A1 | 9/2017 |

OTHER PUBLICATIONS

Extended European Search Report for EP Application No. 20929331.5, dated on Apr. 17, 2023.

* cited by examiner

OBJECT TRACKING DEVICE, OBJECT TRACKING METHOD, AND RECORDING MEDIUM

This application is a National Stage Entry of PCT/JP2020/ 014821 filed on Mar. 31, 2020, the contents of all of which are incorporated herein by reference, in their entirety.

TECHNICAL FIELD

Some non-limiting embodiments relates to an object tracking device, an object tracking method, and a recording medium for tracking objects located near a moving object.

BACKGROUND ART

In the related art, a plurality of methods of tracking objects located near a moving object have been proposed.

For example, Patent Literature 1 discloses a method of detecting and tracking objects near an unmanned aerial vehicle (UAV). In Patent Literature 1, a tracking target object is captured and tracked using an imaging device mounted in the UAV. At this time, the UAV itself or the imaging device is controlled so that the tracking target object is in an assumed capturing state. Specifically, predicted target information representing the assumed capturing state such as a location or a size of the object is obtained, the deviation between the predicted target information and the capturing state of the target object to be actually captured is obtained, a control signal for correction is generated so that the deviation is reduced, and the imaging device is controlled. At this time, information to be controlled is a size or a location of the tracking target object or parameters of the imaging device such as a focus and an exposure time period. Object tracking is performed by adjusting a location and an orientation of the UAV or the imaging device or controlling parameters of the imaging device such as a focus and an exposure time period so that the deviation becomes small.

Also, Patent Literature 2 discloses a method of tracking an object captured by an in-vehicle camera. Because the processing load will be high if all objects detected by the in-vehicle camera are to be tracked, priority is given to each detected object and an object having high priority is tracked preferentially. At this time, in the calculation of the priority, an occlusion rate or a truncation rate of the object itself, whether or not the object is present in a traveling lane, and the like are taken into consideration. Also, in the generation of learning data used during a learning process of an object detector, it is determined whether or not an object is to be tracked at the time of annotation and controlled at the learning stage so that an important object is preferentially detected.

Also, Patent Literature 3 discloses a method of tracking a pedestrian using a Kalman filter and estimating its movement parameter. In Patent Literature 3, when a pedestrian is tracked, a vehicle speed error and a yaw rate error are taken into consideration, but the error represents the resolution of a sensor and is considered to be constant regardless of a magnitude of a speed or a yaw rate.

CITATION LIST

Patent Literature

[Patent Literature 1]
Japanese Unexamined Patent Application, First Publication No. 2018-129063

[Patent Literature 2]
Japanese Unexamined Patent Application, First Publication No. 2019-211831

[Patent Literature 3]
Japanese Unexamined Patent Application, First Publication No. 2018-060326

SUMMARY

Problems to be Solved

The present disclosure is to provide an example of an object tracking device, an object tracking method, and a recording medium for solving the above-described problems.

Means for Solving the Problems

Several aspects of the present disclosure have been made to solve the above-described problems. According to a first aspect, there is provided an object tracking device including: a location information acquisition means configured to acquire location information of an object detected by a sensor; a sensor speed acquisition means configured to acquire speed information of the sensor; a parameter control means configured to generate parameter control information including information for controlling a parameter for use in a tracking process of the object on the basis of the speed information acquired by the sensor speed acquisition means; and an object tracking means configured to perform the tracking process using the parameter control information generated by the parameter control means and the location information acquired by the location information acquisition means.

Also, according to a second aspect of the present disclosure, there is provided an object tracking method including: acquiring location information of an object detected by a sensor; acquiring speed information of the sensor; generating parameter control information including information for controlling a parameter for use in a tracking process of the object on the basis of the acquired speed information; and performing the tracking process using the generated parameter control information and the acquired location information.

Also, according to a third aspect of the present disclosure, there is provided a recording medium recording a program for causing a computer of an object tracking device to execute processes, the processes including: acquiring location information of an object detected by a sensor; acquiring speed information of the sensor; generating parameter control information including information for controlling a parameter for use in a tracking process of the object on the basis of the acquired speed information; and performing the tracking process using the generated parameter control information and the acquired location information.

EXAMPLE EMBODIMENT

Hereinafter, some modes for carrying out the present disclosure will be described in detail with reference to the drawings.

First embodiment

Figure 1:
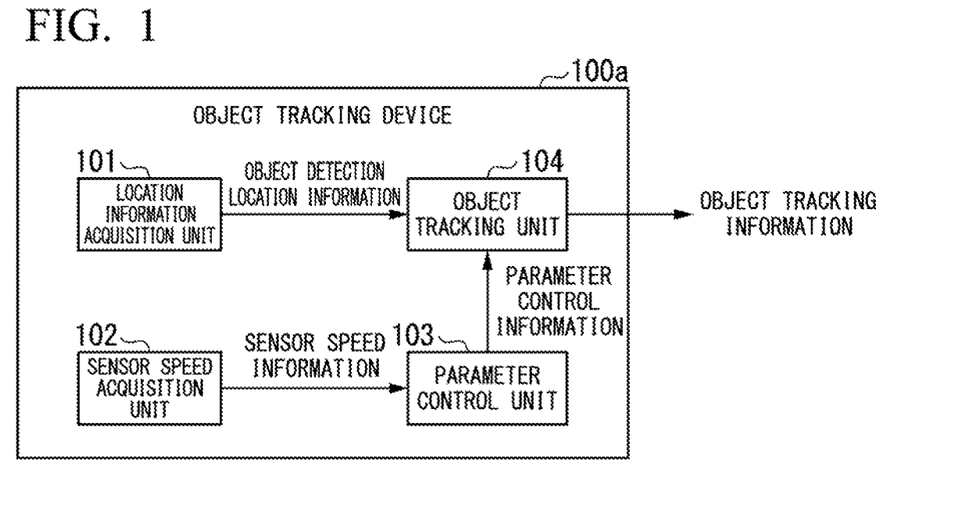
FIG. 1 is a schematic block diagram showing a configuration of an object tracking device according to a first embodiment of the present disclosure.

FIG. 1 is a schematic block diagram showing a configuration of an object tracking device 100a according to the first embodiment of the present disclosure. The object tracking device 100a includes a location information acquisition unit 101 (also referred to as a location information acquisition means), a sensor speed acquisition unit 102 (also referred to as a sensor speed acquisition means), a parameter control unit 103 (also referred to as a parameter control means), and an object tracking unit 104 (also referred to as an object tracking means).

The location information acquisition unit 101 detects an object with a sensor and outputs object detection location information, which is location information of the detected object, to the object tracking unit 104.

The sensor speed acquisition unit 102 acquires sensor speed information and outputs the acquired sensor speed information to the parameter control unit 103.

The parameter control unit 103 outputs the parameter control information for controlling a parameter for use in tracking the object to the object tracking unit 104 on the basis of the sensor speed information output from the sensor speed acquisition unit 102.

The object tracking unit 104 performs object tracking using the object detection location information output from the location information acquisition unit 101 on the basis of the parameter control information output from the parameter control unit 103, and outputs object tracking information that is a tracking result.

Next, an operation of the object tracking device 100a of FIG. 1 will be described.

The location information acquisition unit 101 detects an object located near a moving object using a sensor mounted in the moving object and obtains the location information thereof.

Here, the sensor may be any sensor capable of being used for detecting the location of an object. For example, milli-meter-wave radar or a laser range scanner may be used to detect the presence or absence of nearby objects and their locations using radio waves or light. The coordinates of each detected object that have been obtained are converted into coordinates in the real world and the converted coordinates are output. At this time, the coordinates are denoted according to a coordinate system based on the location of the sensor or a prescribed location of the moving object.

Alternatively, a device, which captures an image of the surroundings, such as a camera, may be used as a sensor. In this case, in combination with image processing technology for detecting an object from an image, nearby objects are detected and locations thereof are estimated. As the image processing method, various existing methods can be used. As an object detection method, for example, a detection method using a previously-trained neural network-based detector or a method of detecting an object using a previously-trained detector after extracting a feature of an edge or the like can be used.

Also, when the sensor is associated with a camera image, the location information may be information on the image. In this case, a method of directly obtaining the location information of the object (i.e., coordinates on the image) from an object detection result can be used as the location estimation. On the other hand, the location information may be converted into a real-world coordinate system. In this case, calibration information of the camera is used to convert the camera coordinates into real-world coordinates to obtain the location of the object. The calibration information is determined according to a location and a pose of the camera and characteristics of a lens and the like and can be obtained in advance.

Alternatively, two cameras may be used to obtain the location according to stereoscopic viewing. In this case, the location of the object can be obtained in various existing stereo methods. Alternatively, a camera capable of measuring a depth such as a time of flight (TOF) camera may be used to obtain the location of the object.

The location information acquisition unit 101 outputs the object detection location information acquired as described above to the object tracking unit 104. The object detection location information includes the number of detected objects, ID information for identifying each detected object, and location information of each object. The object detection location information may further include error information indicating a degree of error capable of being included for each detected location. If the error characteristics differ according to a direction, the object detection location information may include error information for each direction. Even if no object is detected as a result of the detection process, the location information acquisition unit 101 outputs information indicating the result (i.e., information indicating that the number of detected objects is 0) as the object detection location information.

Also, when the sensor is a camera, information indicating appearance characteristics of the object may be output together with the object detection location information. This information can be used for the association of the object during tracking.

The sensor speed acquisition unit 102 acquires a speed of the sensor that detects the location of the object in the object tracking device 100a. Because the speed of the moving object becomes the speed of the sensor when the sensor is fixed to the moving object, it is only required to use a sensor that measures the speed of the moving object. For example, when the moving object is a UAV, the speed of the UAV is acquired as the sensor speed. As a method of measuring and acquiring the speed, any existing method can be used. Here, the sensor speed information may include not only a magnitude of the speed of the sensor but also information about a direction in which the sensor moves. The acquired sensor speed information is output to the parameter control unit 103.

The parameter control unit 103 generates parameter control information including information for controlling a tracking parameter on the basis of the sensor speed information input from the sensor speed acquisition unit 102. Details of the present process will be described below. The parameter control unit 103 outputs the generated parameter control information to the object tracking unit 104.

The object tracking unit 104 performs a tracking process based on a detection result as a tracking process called "tracking by detection" using the object detection location information output from the location information acquisition unit 101. That is, which detected object, included in an object detection result of a present time point, is to be associated with each tracking target object, included in the object tracking result until an immediately previous time point, is obtained, and a tracking result is updated.

As the tracking process, various methods, including methods based on a Kalman filter and a particle filter can be used. Alternatively, a method based on a probabilistic hypothesis density (PHD) filter for estimating a distribution of presence of a plurality of objects or a method based on a cardinal PHD (CPHD) filter for further estimating a distribution of the number of objects at the same time may be used.

Figure 2:
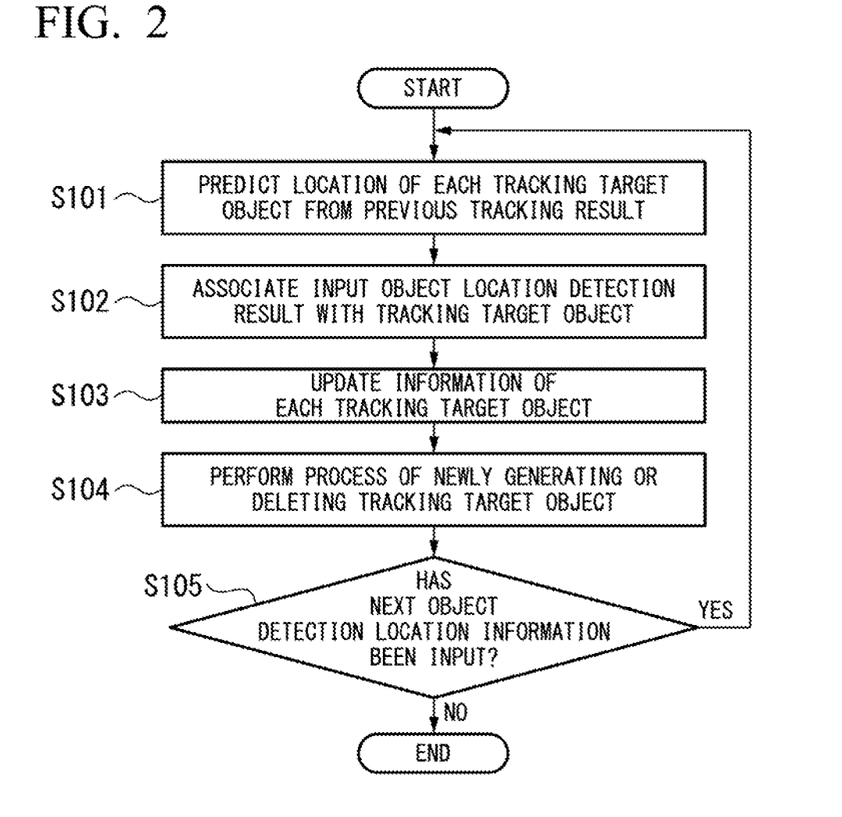
FIG. 2 is a flowchart showing a flow of a tracking process of the object tracking device according to the first embodiment of the present disclosure.

FIG. 2 is a flowchart showing a flow of the tracking process of the object tracking device 100a according to the first embodiment of the present disclosure.

In step S101, a location of each tracking target object is predicted from a previous tracking result. That is, a motion model of the object is obtained on the basis of the previous tracking result, and the location of the object at a present time point is predicted on the basis of the motion model and the previous location information. For example, when tracking using a Kalman filter is performed, a linear motion model is used to predict a current location from an immediately previous location. When a particle filter is used, a location of each particle is determined on the basis of the motion model. At this time, the location is predicted by changing an amount of motion and a direction of each particle in consideration of a distribution of values assumed as the motion.

In step S102, an input object location detection result is associated with the tracking target object. That is, each object that has been detected is associated with a tracking target object. As an index of the association, an association likelihood indicating a certainty of the association can be used and, for example, the similarity of the location can be used. In this case, a distance from the tracking target object to each detected object is obtained, the association likelihood is determined to be a monotone non-increasing function of the distance, and an object having the association likelihood greater than or equal to a prescribed threshold value is considered to be associated. Alternatively, the distance may be used as it is and it may be considered that there is association when the distance is less than or equal to a prescribed threshold value. At this time, instead of a process of performing the association with a simple Euclidean distance, a variance in a location may be taken into consideration and determination may be made using a Mahalanobis distance. Alternatively, when the detected object and the tracking target object are exclusively associated with each other, the association based on a Hungarian method may be performed. The above-described distance can also be used for the cost of association at this time.

As a result, the association information for associating the tracking target object with the detected object is generated. The association information is information indicating which detected object each tracking target object is associated with. At this time, the association likelihood as well as information about whether or not the association has been made may be included. Also, there may be a tracking target object that is not associated with any detected object among tracking target objects. In this case, information indicating non-association is generated for the tracking target object. Likewise, there may be a detected object that is not associated with any tracking target object among detected objects, and information indicating non-association is similarly generated as association information.

Also, if the sensor is a camera and appearance features can also be used, the association may be also performed in consideration of a similarity of the appearance features. That is, the association likelihood may be obtained using both a location similarity and an appearance feature similarity and the association may be performed. As a combination method at this time, various existing methods can be used. For example, the association likelihood may be obtained based on weighted addition of the similarities.

In step S103, information of each tracking target object is updated. When an object is tracked using the Kalman filter, the location of the tracking target object is updated in accordance with an update formula of the Kalman filter according to the location of the detected object that has been associated. When an object is tracked using a particle filter, the association likelihood of each particle is obtained, a location with the highest likelihood as a whole is set as a location of the object tracking object, and re-sampling of the particles is performed in accordance with the likelihood. For a tracking target object that has not been associated, a predicted location is regarded as a current location and the location of the object is updated.

Also, the tracking likelihood, which is the likelihood indicating the certainty of the tracking target object, is also updated. When the association likelihood is greater than the prescribed value, the tracking result is considered to be certain, so the value of the tracking likelihood is increased. On the other hand, when the association likelihood is less than the prescribed value or in a non-association case, the value of the tracking likelihood is decreased.

On the other hand, when tracking is performed using a PHD filter or a CPHD filter, a tracking likelihood is automatically calculated using the update formula of the filter because a distribution itself represents a probability of the presence of an object. Specifically, the association likelihood, a frequency of occurrence of non-detection (or a detection rate indicating a degree to which an object is detected), and a clutter generation rate indicating a frequency of occurrence of false detection are used and calculated using a prescribed update formula.

In step S104, a process of newly generating and deleting a tracking target object is performed. Because an unassociated detected object that has not been associated with any tracking target object is likely to be a newly appearing object, a tracking target object corresponding to the detected object is newly generated and added to the object tracking result. In particular, because there is no tracking target object at the start of tracking, all detected objects are added to an object tracking result and used in subsequent tracking. At this time, as the initial tracking likelihood to be given, a prescribed value may be used or changed according to the certainty of detection. Also, in the case of a PHD filter or a CPHD filter, the tracking likelihood may be determined using a probability of occurrence of an object. Also, when the Kalman filter is used, a prescribed initial value is set as a variance of a location or a speed. When a particle filter is used, the number of particles to be used is further set as a parameter.

On the other hand, as for an unassociated tracking target object that has not been associated with any detected object, a case where a tracking target object added on the basis of previous false detection or a tracking target object disappearing outside of the coverage of the sensor can occur, in addition to a case where the tracking target object happens to be undetected in a current frame. Consequently, it is determined that the tracking target object whose tracking likelihood is low due to continuously repeated non-association is unlikely to be present at a present time point and the tracking target object is deleted.

In step S105, it is determined whether or not the next object detection location information has been input from the location information acquisition unit 101. When the object detection location information has been input (YES in step S105), the process returns to step S101. Otherwise (NO in step S105), the process of the flowchart of FIG. 2 ends.

In this way, the object tracking unit 104 generates and outputs object tracking information at a present time point. Here, the object tracking information includes a location of an object, ID information assigned to each tracking target object, and ID information of an associated detected object (information indicating non-association when the object has not been associated).

Also, a description method for location information is arbitrary. When the sensor is a camera and the location information indicates a location on a screen, a circumscribed rectangle of a tracking object may be obtained, the location may be indicated by the information itself, or coordinates of a point in a tracking object area (for example, a determined point such as the center or the midpoint of the lower side of the circumscribed rectangle of the object) may be obtained. Alternatively, when the location information is represented by real space coordinates, the location information is converted into a prescribed coordinate system and the converted location information is output as necessary. For example, when originally obtained location coordinates are associated with an individual coordinate system for each sensor and the conversion into the coordinate system determined according to the moving object is necessary, a conversion formula for performing conversion from the sensor coordinate system into a coordinate system of the moving object is obtained on the basis of an installation location or an orientation of the sensor, location coordinates obtained in the above-described tracking are converted, and the converted location coordinates are output.

The object tracking unit 104 controls, on the basis of parameter control information output from the parameter control unit 103, tracking parameters for use in the tracking process described above, such as a threshold value for an association likelihood, a degree to which a tracking likelihood is changed at the time of update, an initial tracking likelihood, variance values in an initial object location and speed, the number of particles of a particle filter, and a threshold value for the tracking likelihood when the tracking target object is deleted. Also, parameters based on sensor detection characteristics such as a detection rate and a clutter generation rate (hereinafter referred to as sensor characteristic parameters) used for updating the PHD and CPHD filters are also controlled on the basis of the parameter control information output from the parameter control unit 103. These control processes will be described together in the description of the operation of the parameter control unit 103 to be described below.

Next, the parameter control unit 103 will be described with reference to the drawings.

Figure 3:
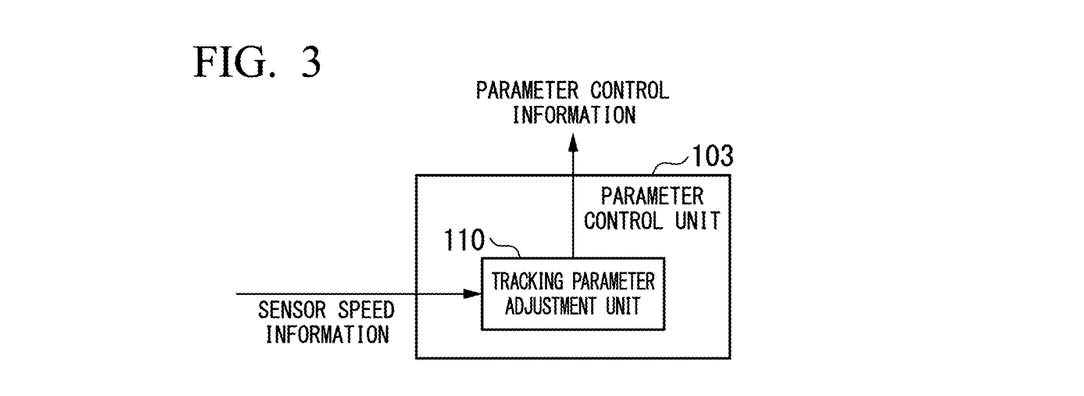
FIG. 3 is a diagram showing an example of a configuration of a parameter control unit (FIG. 1) of the object tracking device according to the first embodiment of the present disclosure.

FIG. 3 is a diagram showing an example of a configuration of the parameter control unit 103 (FIG. 1) of the object tracking device 100a according to the first embodiment of the present disclosure. The parameter control unit 103 shown in FIG. 3 includes a tracking parameter adjustment unit 110. The tracking parameter adjustment unit 110 adjusts a tracking parameter on the basis of sensor speed information, generates parameter control information, and outputs the generated parameter control information to the object tracking unit 104 (FIG. 1).

Next, an operation of the parameter control unit 103 of FIG. 3 will be described.

The tracking parameter adjustment unit 110 adjusts a tracking parameter according to sensor speed information that has been input. If the moving object is moving and there is a delay until location information is actually output after the sensor detects an object, the location information output from the sensor is likely to deviate from a current location of the object. Although no major problem will occur if this delay is constant, it is difficult to ignore an influence of location deviation on the tracking if the variation of the delay is large and the speed of the moving object is large. As a result, an influence in which the object tracking result is easily disconnected or the like can be exerted.

In order to avoid this problem, when the speed of the moving object is high, a parameter for use in associating a detected object with a tracking target object is controlled in consideration of a possibility that location deviation will be large. Specifically, a threshold value for an association likelihood is set to a small value (or a threshold value for a distance between the detected object and the tracking target object is set to a large value). Also, when a tracking target object is newly generated, a variance value in the location or speed of the object is set to a large value. Alternatively, the number of particles for use in the particle filter may be increased and more locations may be added to tracking candidates.

Also, in consideration of the fact that the tracking is likely to be disconnected due to location deviation, a range of a change in the tracking likelihood when the tracking likelihood is updated may be reduced or a threshold value for the tracking likelihood when the tracking target object is deleted may be lowered.

The tracking parameter adjustment unit 110 retains information (a conversion table, logic information required for conversion, or the like) for describing a relationship between a sensor speed and a changed value of the above-mentioned parameter, obtains a changed value of a tracking parameter to be changed when sensor speed information is input, generates parameter control information including the changed value, and outputs the generated parameter control information to the object tracking unit 104 (FIG. 1). The object tracking unit 104 tracks an object using a value of a parameter included in the parameter control information.

In this way, by controlling the tracking parameter in accordance with a magnitude of the sensor speed, the disconnection of tracking can be reduced and the accuracy of tracking is improved.

Next, another example of the parameter control unit 103 (FIG. 1) will be described.

Figure 4:
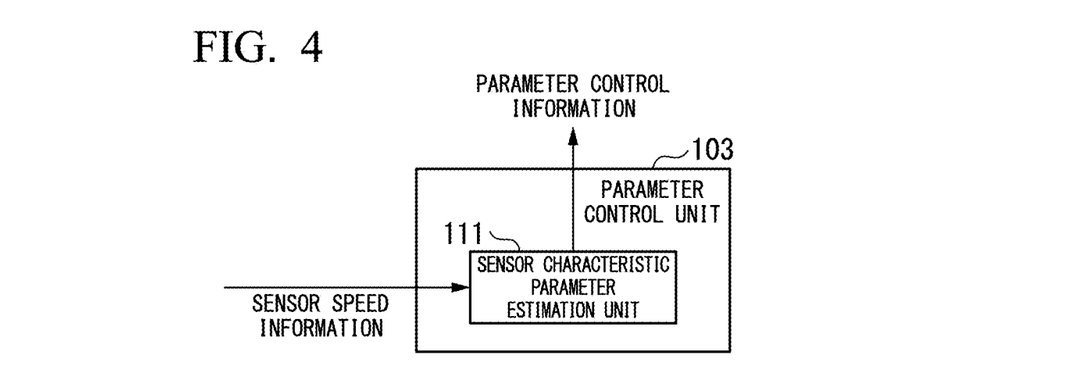
FIG. 4 is a diagram showing another example of the configuration of the parameter control unit (FIG. 1) of the object tracking device according to the first embodiment of the present disclosure.

FIG. 4 is a diagram showing another example of the configuration of the parameter control unit 103 (FIG. 1) of the object tracking device 100a according to the first embodiment of the present disclosure. The parameter control unit 103 shown in FIG. 4 includes a sensor characteristic parameter estimation unit 111. The sensor characteristic parameter estimation unit 111 estimates a sensor characteristic parameter on the basis of sensor speed information, generates parameter control information, and outputs the generated parameter control information to the object tracking unit 104 (FIG. 1).

Next, an operation of the parameter control unit 103 of FIG. 4 will be described.

The sensor characteristic parameter estimation unit 111 estimates a sensor characteristic parameter on the basis of the input sensor speed information.

According to the sensor, sensor characteristic parameters such as a detection rate or a clutter generation rate are changeable according to a moving speed. For example, in the case of a camera, the characteristics of object detection change due to motion blurring. Consequently, when a sensor affected by the moving speed is used, a detection rate and a clutter generation rate are estimated in accordance with the sensor speed.

For example, it is only required to actually measure the characteristics of the sensor in accordance with various speeds in advance and store the actually measured characteristics in association with a sensor speed. The sensor characteristic parameter estimation unit 111 reads a corresponding sensor characteristic value in accordance with the sensor speed that has been input, generates parameter control information including a read sensor characteristic parameter value, and outputs the generated parameter control information to the object tracking unit 104 (FIG. 1). The object tracking unit 104 tracks an object using the sensor characteristic parameter value included in the parameter control information.

Thereby, because the sensor characteristic parameter for use in tracking is close to an actual value, the accuracy of tracking is improved.

As described above, in the first embodiment, by controlling the parameter using the sensor speed, it is possible to perform tracking according to the speed of the moving object and improve the accuracy of tracking of an object located near the moving object.

Second embodiment

Next, a second embodiment of the present disclosure will be described. A description of parts that are the same as those of the object tracking device 100a according to the first embodiment in a configuration and a process of an object tracking device according to the second embodiment will be omitted.

Figure 5:
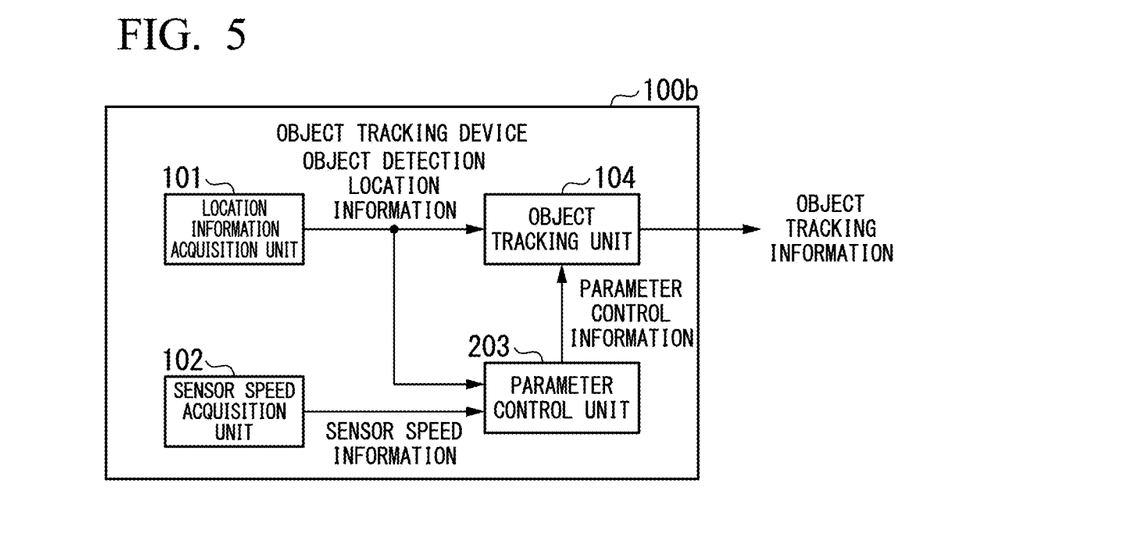
FIG. 5 is a schematic block diagram showing a configuration of an object tracking device according to a second embodiment of the present disclosure.

FIG. 5 is a schematic block diagram showing a configuration of an object tracking device 100b according to the second embodiment of the present disclosure. The object tracking device 100b includes a location information acquisition unit 101, a sensor speed acquisition unit 102, a parameter control unit 203, and an object tracking unit 104. When the object tracking device 100b of FIG. 5 is compared with the object tracking device 100a of FIG. 1, the object tracking device 100b of FIG. 5 includes the parameter control unit 203 instead of the parameter control unit 103.

Object detection location information output from the location information acquisition unit 101 is output to the object tracking unit 104 and the parameter control unit 203. Sensor speed information output from the sensor speed acquisition unit 102 is output to the parameter control unit 203. The parameter control unit 203 generates parameter control information on the basis of the object detection location information output from the location information acquisition unit 101 and the sensor speed information output from the sensor speed acquisition unit 102 and outputs the generated parameter control information to the object tracking unit 104. Because the other connection relationships are similar to those in FIG. 1, their description will be omitted.

Next, an operation of the object tracking device 100b of FIG. 5 will be described.

Operations of the location information acquisition unit 101, the sensor speed acquisition unit 102, and the object tracking unit 104 are similar to those in the case of FIG. 1.

The parameter control unit 203 generates parameter control information including information for controlling a tracking parameter on the basis of object detection location information output from the location information acquisition unit 101 and sensor speed information input from the sensor speed acquisition unit 102. Details of this process will be described below. The generated parameter control information is output to the object tracking unit 104.

Next, details of the parameter control unit 203 will be described.

Figure 6:
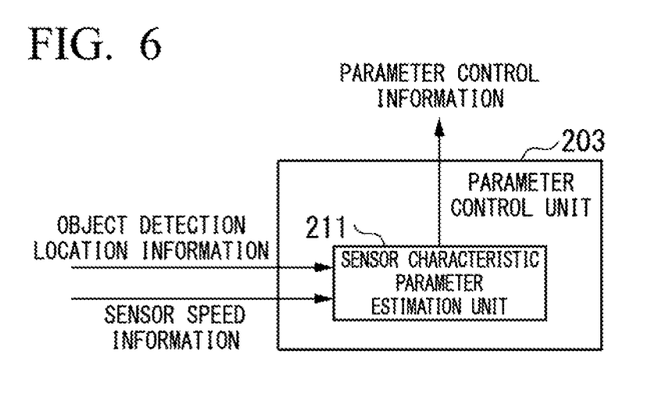
FIG. 6 is a diagram showing an example of a configuration of a parameter control unit (FIG. 5) of the object tracking device according to the second embodiment of the present disclosure.

FIG. 6 is a diagram showing an example of a configuration of the parameter control unit 203 (FIG. 5) of the object tracking device 100b according to the second embodiment of the present disclosure. The parameter control unit 203 shown in FIG. 6 includes a sensor characteristic parameter estimation unit 211. The sensor characteristic parameter estimation unit 211 estimates a sensor characteristic parameter on the basis of object detection location information and sensor speed information, generates parameter control information, and outputs the generated parameter control information to the object tracking unit 104 (FIG. 5).

Next, an operation of the parameter control unit 203 of FIG. 6 will be described.

The sensor characteristic parameter estimation unit 211 of FIG. 6 is different from the sensor characteristic parameter estimation unit 111 of FIG. 4 in that a sensor characteristic parameter is estimated using object detection location information actually obtained by the sensor. In characteristics related to detection such as the detection rate and the clutter generation rate of the sensor, there is an individual difference specific to the sensor and there is a certain degree of variation. Thus, unless an adjustment is made individually for each sensor, there may be deviation from a set value. A case where the performance of the sensor may change on the way due to deterioration over time or the like is also taken into consideration. When the detection characteristics of the sensor deviate in this way, the tracking performed using the value like the PHD or CPHD filter is also adversely affected. In order to avoid this, it is necessary to estimate and correct the characteristics of the sensor.

If the moving object is stationary, the nearby stationary objects will continue to remain stationary, so it is possible to associate the same objects in chronological order without having to track them. As a result, non-detection can be easily determined and the detection rate can be estimated. Also, even if an object is moving nearby, the movement is simpler than when the moving object is moving, so that it is easy to track the object. Consequently, the determination of false detection also becomes easy.

Therefore, it is desirable to estimate the detection rate or the clutter generation rate based on the actual detection result only when the moving object is stopped or moving slower than a constant speed. Consequently, the sensor characteristic parameter estimation unit 211 performs the above-described estimation only when the magnitude of the sensor speed is less than or equal to a prescribed threshold value. The sensor characteristic parameter estimation unit 211 generates parameter control information at a time point when an estimated result is obtained and outputs the parameter control information to the object tracking unit 104 (FIG. 5).

By doing so, it is possible to improve the accuracy of estimation of the sensor characteristic parameters in consideration of an individual difference specific to the sensor and improve the accuracy of tracking.

Next, another example of the parameter control unit 203 (FIG. 5) will be described.

Figure 7:
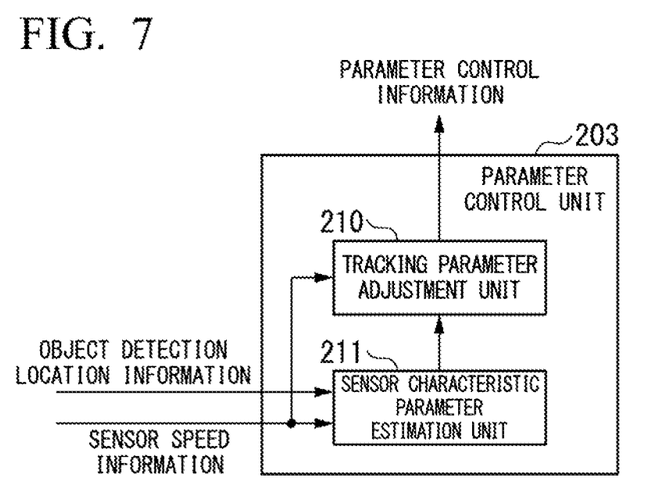
FIG. 7 is a diagram showing another example of the configuration of the parameter control unit (FIG. 5) of the object tracking device according to the second embodiment of the present disclosure.

FIG. 7 is a diagram showing another example of the configuration of the parameter control unit 203 (FIG. 5) of the object tracking device 100*b* according to the second embodiment of the present disclosure. The parameter control unit 203 shown in FIG. 7 includes a tracking parameter adjustment unit 210 and a sensor characteristic parameter estimation unit 211. The sensor characteristic parameter estimation unit 211 estimates a sensor characteristic parameter on the basis of sensor speed information and object detection location information, generates parameter control information, and outputs the parameter control information to the tracking parameter adjustment unit 210. The tracking parameter adjustment unit 210 generates parameter control information by adjusting a tracking parameter on the basis of the sensor speed information and the parameter control information related to sensor characteristics output from the sensor characteristic parameter estimation unit 211 and outputs the generated parameter control information to the object tracking unit 104 (FIG. 5).

Next, an operation of the parameter control unit 203 of FIG. 7 will be described.

The operation of the sensor characteristic parameter estimation unit 211 is similar to the operation described with reference to FIG. 6.

The operation of the tracking parameter adjustment unit 210 is similar to the operation of the tracking parameter adjustment unit 110 of FIG. 3, but they are different in that an adjustment to the tracking parameter is further made on the basis of the sensor characteristic parameter control information output from the sensor characteristic parameter estimation unit 211.

For example, when the parameter control information output from the sensor characteristic parameter estimation unit 211 indicates that an estimated clutter generation rate is increasing, the association parameter is strictly set (a threshold value for the association likelihood is increased (a threshold value for the distance is decreased) or the like) so that the tracking target object is not mistakenly associated with the clutter. For the adjustment to this tracking parameter, for example, it is only necessary to determine in advance how to change the tracking parameter with respect to the clutter generation rate and retain a corresponding relationship. The tracking parameter to be used is then selected in accordance with an input clutter generation rate.

The sensor characteristic parameter estimation unit 211 adjusts the value of the tracking parameter in this way and generates parameter control information including this value. The output parameter control information may include only information about the tracking parameter or may include information about both the tracking parameter and the sensor characteristic parameter output from the sensor characteristic parameter estimation unit 211.

In this way, by adjusting the tracking parameter using the parameters based on the sensor characteristics, a more appropriate parameter adjustment becomes possible and the accuracy of tracking is improved.

As described above, in the second embodiment, by generating the parameter control information using not only the sensor speed but also the object detection location information, more appropriate tracking can be performed and the accuracy of tracking is improved.

Example of Configuration of Hardware

Here, configurations of hardware of the object tracking device 100*a* (FIG. 1) according to the first embodiment and the object tracking device 100*b* (FIG. 5) according to the second embodiment will be described below. Each functional component of the object tracking devices 100*a* and 100*b* may be implemented by hardware for implementing each functional component (for example, a hard-wired electronic circuit or the like) or a combination of hardware and software (for example, a combination of an electronic circuit and a program for controlling the electronic circuit or the like). Hereinafter, a case where each functional component of the object tracking devices 100*a* and 100*b* is implemented by a combination of hardware and software will be further described.

Figure 8:
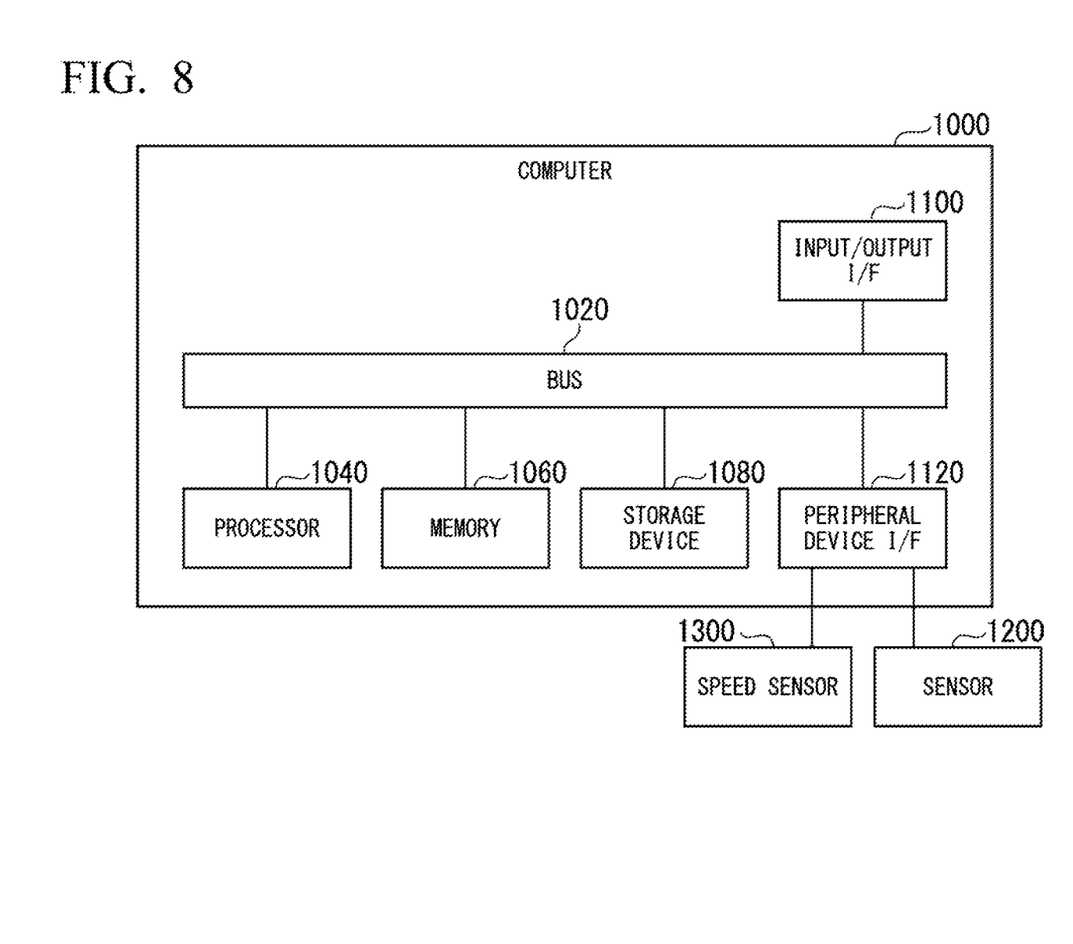
FIG. 8 is a diagram showing an example of a computer, a sensor, and a speed sensor for implementing an object tracking device.

FIG. 8 is a diagram showing an example of a computer 1000, a sensor 1200, and a speed sensor 1300 for implementing the object tracking devices 100*a* and 100*b*. The computer 1000 is any computer. For example, the computer 1000 is a personal computer (PC), an industrial computer, or the like. The computer 1000 may be a dedicated computer designed to implement the object tracking devices 100*a* and 100*b* or may be a general-purpose computer.

The computer 1000 includes a bus 1020, a processor 1040, a memory 1060, a storage device 1080, an input/output interface (I/F) 1100, and a peripheral device I/F 1120.

The bus 1020 is a data transmission path for the processor 1040, the memory 1060, the storage device 1080, the input/output I/F 1100, and the peripheral device I/F 1120 to transmit and receive data to and from each other. However, a method of connecting the processor 1040 and the like to each other is not limited to a bus connection.

The processor 1040 may include various processors such as a central processing unit (CPU), a graphics processing unit (GPU), and a field-programmable gate array (FPGA).

The memory 1060 is a main storage device implemented using a random-access memory (RAM) or the like.

The storage device 1080 is an auxiliary storage device implemented using a hard disk, a solid-state drive (SSD), a memory card, a read-only memory (ROM), or the like.

The input/output I/F 1100 is an interface for connecting the computer 1000 and the input/output device. For example, an input device such as a keyboard and an output device such as a display device are connected to the input/output I/F 1100.

The peripheral device I/F 1120 is an interface for connecting the peripheral device to the computer 1000. The peripheral device I/F 1120 is, for example, an interface such as a universal serial bus (USB) or IEEE 1394 interface. Alternatively, the peripheral device I/F 1120 is a wired or wireless network interface or an interface such as Bluetooth.

Further, a sensor 1200 and a speed sensor 1300 are connected to the peripheral device interface I/F. The sensor 1200 and the speed sensor 1300 can communicate with the computer 1000 via the peripheral device interface I/F. Here, the sensor 1200 and the speed sensor 1300 correspond to the location information acquisition unit 101 and the sensor speed acquisition unit 102 of the object tracking devices 100a and 100b, respectively. When the location information acquisition unit 101 analyzes an image acquired by a camera and obtains a location of an object, the camera and the function of processing the image are combined. In this case, only the camera may be connected as the sensor, and the subsequent processing may be executed on the computer 1000 side.

The storage device 1080 stores program modules that implement the parts of the object tracking device 100a or 100b. The processor 1040 implements a function corresponding to each program module by reading each of these program modules into the memory 1060 and executing the program module.

Figure 9:
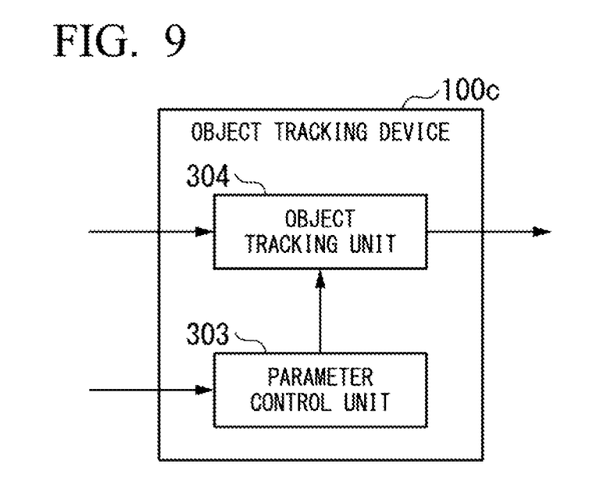
FIG. 9 is a block diagram showing a configuration of an object tracking device having the minimum configuration.

FIG. 9 is a block diagram showing a configuration of an object tracking device 100c having the minimum configuration. The object tracking device 100c includes a parameter control unit 303 and an object tracking unit 304.

Figure 10:
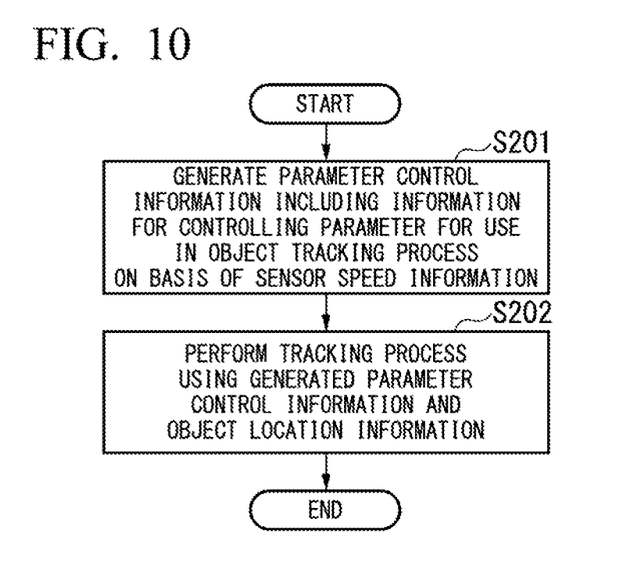
FIG. 10 is a flowchart showing a process of the object tracking device having the minimum configuration.

FIG. 10 is a flowchart showing a processing of the object tracking device 100c having the minimum configuration.

The parameter control unit 303 generates parameter control information including information for controlling a parameter for use in the object tracking process on the basis of speed information of the sensor (step S201).

The object tracking unit 304 performs a tracking process using the parameter control information generated by the parameter control unit 303 and location information of an object (step S202).

The present disclosure has been described above as an example in which the above-mentioned first and second embodiments are applied. However, the technical scope of the present disclosure is not limited to the scope described in each of the above-described embodiments. It will be apparent to those skilled in the art that various changes or improvements can be made to such embodiments. In such cases, new embodiments with such modifications or improvements may also be included in the technical scope of the present disclosure. This is clear from the matters described in the claims.

A part or all of the above-described first or second embodiment may be described as in the following appendixes, but the present disclosure is not limited to the following appendixes.

Appendix 1

An object tracking device including:

a location information acquisition means configured to acquire location information of an object detected by a sensor;

a sensor speed acquisition means configured to acquire speed information of the sensor;

a parameter control means configured to generate parameter control information including information for controlling a parameter for use in a tracking process of the object on the basis of the speed information acquired by the sensor speed acquisition means; and an object tracking means configured to perform the tracking process using the parameter control information generated by the parameter control means and the location information acquired by the location information acquisition means.

Appendix 2

The object tracking device according to appendix 1, wherein the parameter control means further generates the parameter control information using the location information acquired by the location information acquisition means.

Appendix 3

The object tracking device according to appendix 1, wherein the parameter control means adjusts a first parameter related to the tracking process on the basis of the speed information acquired by the sensor speed acquisition means and generates the parameter control information.

Appendix 4

The object tracking device according to appendix 2, wherein the parameter control means estimates a second parameter related to detection characteristics of the sensor on the basis of the speed information acquired by the sensor speed acquisition means and generates the parameter control information.

Appendix 5

The object tracking device according to appendix 4, wherein, when the speed information acquired by the sensor speed acquisition means is less than or equal to a prescribed value, the parameter control means estimates the second parameter related to the detection characteristics of the sensor using the location information acquired by the location information acquisition means and generates the parameter control information.

Appendix 6

The object tracking device according to appendix 2, wherein, when the speed information acquired by the sensor speed acquisition means is less than or equal to a prescribed value, the parameter control means estimates a second parameter related to detection characteristics of the sensor using the location information acquired by the location information acquisition means and generates first parameter control information, and wherein the parameter control means adjusts a first parameter on the basis of the speed information acquired by the sensor speed acquisition means and the first parameter control information and generates the parameter control information in accordance with the adjusted first parameter and the estimated second parameter.

Appendix 7

The object tracking device according to appendix 3 or 6, wherein the first parameter for use in the tracking process includes at least one of a threshold value for an association likelihood for use in association between the object detected in the tracking process and a tracking target object, a degree to which a tracking likelihood indicating a certainty of the tracking target object is changed, an initial tracking likelihood, variance values in an initial object location and speed, the number of particles of a particle filter, and a threshold value for the tracking likelihood when the tracking target object is deleted.

Appendix 8

The object tracking device according to appendix 4 or 6, wherein the second parameter related to the detection characteristics of the sensor includes at least one of an object detection rate and a clutter generation rate.

Appendix 9

The object tracking device according to any one of appendixes 1 to 8, wherein the sensor for use in the location information acquisition means detects the object using radio waves or light and detects a location of the object.

Appendix 10

The object tracking device according to any one of appendixes 1 to 8, wherein the sensor for use in the location information acquisition means is a camera capable of acquiring an image and detects the object by analyzing the image that has been obtained.

Appendix 11

An object tracking method including:
acquiring location information of an object detected by a sensor;
acquiring speed information of the sensor;
generating parameter control information including information for controlling a parameter for use in a tracking process of the object on the basis of the acquired speed information; and
performing the tracking process using the generated parameter control information and the acquired location information.

Appendix 12

A recording medium recording a program for causing a computer of an object tracking device to execute processes, the processes including:
acquiring location information of an object detected by a sensor;
acquiring speed information of the sensor;
generating parameter control information including information for controlling a parameter for use in a tracking process of the object on the basis of the acquired speed information; and
performing the tracking process using the generated parameter control information and acquired the location information.

INDUSTRIAL APPLICABILITY

The object tracking device according to some aspects of the present disclosure can be used to detect and track nearby objects using a sensor mounted in a moving object such as a UAV and to ascertain whether or not there are obstacles or the like nearby. Moving objects include all objects that move in a state in which a sensor for detecting objects is mounted such as a vehicle, a robot, a ship, and a submarine as well as a UAV.

Reference Signs List 100a, 100b, 100c Object tracking device
101 Location information acquisition unit
102 Sensor speed acquisition unit
103 Parameter control unit
104 Object tracking unit
110 Tracking parameter adjustment unit
111 Sensor characteristic parameter estimation unit
203 Parameter control unit
210 Tracking parameter adjustment unit
211 Sensor characteristic parameter estimation unit
303 Parameter control unit
304 Object tracking unit
1000 Computer
1020 Bus
1040 Processor
1060 Memory
1080 Storage device
1100 Input/output I/F
1120 Peripheral device I/F
1200 Sensor
1300 Speed sensor

What is claimed is:

1. An object tracking device comprising:
at least one memory storing instructions; and
at least one processor configured to execute the instructions to:
acquire location information of an object detected by a sensor;
acquire speed information of the sensor;
generate parameter control information including information for controlling a parameter for use in a tracking process of the object on the basis of the acquired speed information and the acquired location information; and
perform the tracking process using the generated parameter control information and the acquired location information,
wherein in generating the parameter control information, the at least one processor is configured to execute the instructions to estimate, when the acquired speed information is less than or equal to a prescribed value, a second parameter related to detection characteristics of the sensor using the acquired location information.

2. The object tracking device according to claim 1, wherein, in generating the parameter controller information, the at least one processor is configured to execute the instructions to adjust a first parameter related to the tracking process on the basis of the acquired speed information.

3. The object tracking device according to claim 2, wherein the first parameter for use in the tracking process includes at least one of a threshold value for an association likelihood for use in association between the object detected in the tracking process and a tracking target object, a degree to which a tracking likelihood indicating a certainty of the tracking target object is changed, an initial tracking likelihood, variance values in an initial object location and speed, a number of particles of a particle filter, and a threshold value for the tracking likelihood when the tracking target object is deleted.

4. The object tracking device according to claim 1,
wherein in generating the parameter control information, the at least one processor is configured to execute the instructions to:
estimate, when the acquired speed information is less than or equal to the prescribed value, the second parameter related to the detection characteristics of the sensor using the acquired location information and generate first parameter control information; and
adjust a first parameter on the basis of the acquired speed information and the first parameter control information and generate the parameter control information in accordance with the adjusted first parameter and the estimated second parameter.

5. The object tracking device according to claim 4, wherein the first parameter for use in the tracking process includes at least one of a threshold value for an association likelihood for use in association between the object detected in the tracking process and a tracking target object, a degree to which a tracking likelihood indicating a certainty of the tracking target object is changed, an initial tracking likelihood, variance values in an initial object location and speed, a number of particles of a particle filter, and a threshold value for the tracking likelihood when the tracking target object is deleted.

6. The object tracking device according to claim 4, wherein the second parameter related to the detection characteristics of the sensor includes at least one of an object detection rate and a clutter generation rate.

7. The object tracking device according to claim 1, wherein the second parameter related to the detection characteristics of the sensor includes at least one of an object detection rate and a clutter generation rate.

8. The object tracking device according to claim 1, wherein the sensor for use in the acquiring of the location information detects the object using radio waves or light and detects a location of the object.

9. The object tracking device according to claim 1, wherein the sensor for use in the acquiring of the location information is a camera capable of acquiring an image and detects the object by analyzing the image that has been obtained.

10. An object tracking method performed by a computer and comprising:
acquiring location information of an object detected by a sensor;
acquiring speed information of the sensor;
generating parameter control information including information for controlling a parameter for use in a tracking process of the object on the basis of the acquired speed information and the acquired location information; and
performing the tracking process using the generated parameter control information and the acquired location information,
wherein the generating the parameter control information includes estimating, when the acquired speed information is less than or equal to a prescribed value, a second parameter related to detection characteristics of the sensor using the acquired location information.

11. A non-transitory computer-readable recording medium storing a program executable by a computer of an object tracking device to perform processing comprising:
acquiring location information of an object detected by a sensor;
acquiring speed information of the sensor;
generating parameter control information including information for controlling a parameter for use in a tracking process of the object on the basis of the acquired speed information and the acquired location information; and
performing the tracking process using the generated parameter control information and the acquired location information,
wherein the generating the parameter control information includes estimating, when the acquired speed information is less than or equal to a prescribed value, a second parameter related to detection characteristics of the sensor using the acquired location information.

* * * * *